(12) United States Patent
Ford et al.

(10) Patent No.: US 9,119,044 B2
(45) Date of Patent: *Aug. 25, 2015

(54) METHOD FOR SENDING A DATA MESSAGE DURING A TELEPHONE CALL

(71) Applicant: Nokia Corporation, Espoo (FI)

(72) Inventors: Peter J. Ford, Bacup (GB); Ian Nash, Reading (GB); Ron Bird, Pinner (GB); Alan Wilkinson, London (GB); Lee Cooper, Sunderland (GB); Minna Asikainen, Tampere (FI); Inmaculada Espigares, Helsinki (FI); Ari O. Tourunen, Espoo (FI); Vesa-Matti Hakkarainen, Tampere (FI)

(73) Assignee: Nokia Corporation, Espoo (FI)

( * ) Notice: Subject to any disclaimer, the term of this patent is extended or adjusted under 35 U.S.C. 154(b) by 74 days.

This patent is subject to a terminal disclaimer.

(21) Appl. No.: 14/087,429

(22) Filed: Nov. 22, 2013

(65) Prior Publication Data

US 2014/0087774 A1 Mar. 27, 2014

Related U.S. Application Data

(63) Continuation of application No. 10/725,274, filed on Nov. 25, 2003, now Pat. No. 8,670,790.

(30) Foreign Application Priority Data

Nov. 22, 2003 (GB) .................................. 0327217.6

(51) Int. Cl.
*H04W 4/00* (2009.01)
*H04W 4/14* (2009.01)
(Continued)

(52) U.S. Cl.
CPC ............. *H04W 4/14* (2013.01); *H04M 1/72547* (2013.01); *H04W 4/12* (2013.01); *H04W 8/26* (2013.01)

(58) Field of Classification Search
CPC ........... H04W 4/14; H04W 4/12; H04W 8/26; H04M 1/72547
USPC ........ 455/466, 412.1–420, 556.2, 557, 422.1, 455/450–455, 464, 509; 370/328–337, 339, 370/341–348, 431–463; 715/764, 810–845; D14/485, 486
See application file for complete search history.

(56) References Cited

U.S. PATENT DOCUMENTS

| 5,483,588 A | 1/1996 | Eaton et al. .............. 379/202.01 |
| 5,533,019 A | 7/1996 | Jayapalan ..................... 370/352 |

(Continued)

FOREIGN PATENT DOCUMENTS

| EP | 0647077 A3 | 3/1999 |
| EP | 1444846 B1 | 6/2006 |
| JP | 11136393 | 5/1999 |

*Primary Examiner* — Ronald Eisner
(74) *Attorney, Agent, or Firm* — Harrington & Smith

(57) ABSTRACT

A method of sending data from a first party participating in a telephone call to a second party participating in the telephone call, comprising, in the terminal of the first party, storing, as a consequence of the telephone call, identifier data that identifies the second party; using the stored identifier data to determine automatically a destination address for a data message; and sending, during the telephone call, the data message with the automatically determined destination address. A method for sending data from a first party participating in a telephone call to a second party participating in the telephone call, comprising, in the terminal of the first party: providing, while the telephone call is on-going, a user selectable option to transfer data to another party participating in the telephone call without user specification of a destination address.

20 Claims, 3 Drawing Sheets

(51) Int. Cl.
*H04M 1/725* (2006.01)
*H04W 4/12* (2009.01)
*H04W 8/26* (2009.01)

(56) References Cited

U.S. PATENT DOCUMENTS

| | | | |
|---|---|---|---|
| 5,819,180 A | 10/1998 | Alperovich et al. | 455/465 |
| 6,366,771 B1 | 4/2002 | Angle et al. | 455/414.1 |
| 6,493,338 B1 | 12/2002 | Preston et al. | 370/352 |
| 6,980,641 B1 | 12/2005 | Stanford et al. | 379/354 |
| 7,450,957 B2 | 11/2008 | Ala-Luukko | 455/466 |
| 8,225,363 B1 * | 7/2012 | Joshi et al. | 725/109 |
| 2001/0016835 A1 | 8/2001 | Hansmann et al. | 705/40 |
| 2001/0028709 A1 | 10/2001 | Makela et al. | 379/214.01 |
| 2001/0034225 A1 * | 10/2001 | Gupte et al. | 455/412 |
| 2001/0051528 A1 | 12/2001 | Lielbriedis | 455/466 |
| 2002/0042264 A1 | 4/2002 | Kim | 455/414 |
| 2002/0140727 A1 | 10/2002 | Lindholm | 345/744 |
| 2002/0165013 A1 | 11/2002 | Bright et al. | 455/567 |
| 2003/0063580 A1 | 4/2003 | Pond | 370/328 |
| 2004/0072585 A1 * | 4/2004 | Le et al. | 455/466 |
| 2004/0110462 A1 | 6/2004 | Forstadius | 455/3.01 |
| 2004/0151287 A1 | 8/2004 | Bedner | 379/88.19 |
| 2004/0230915 A1 | 11/2004 | Diering et al. | 715/810 |
| 2005/0096071 A1 | 5/2005 | Lin et al. | 455/466 |
| 2008/0153471 A1 | 6/2008 | Paik et al. | 455/415 |

* cited by examiner

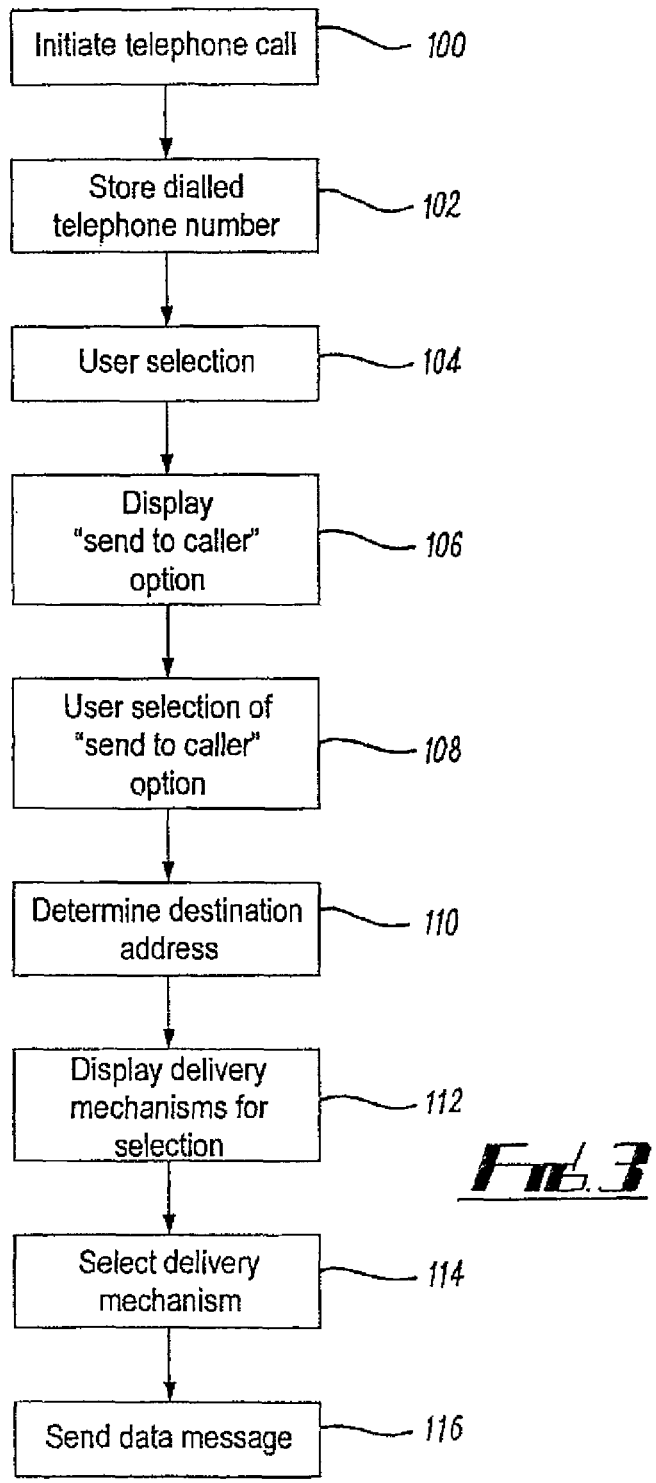

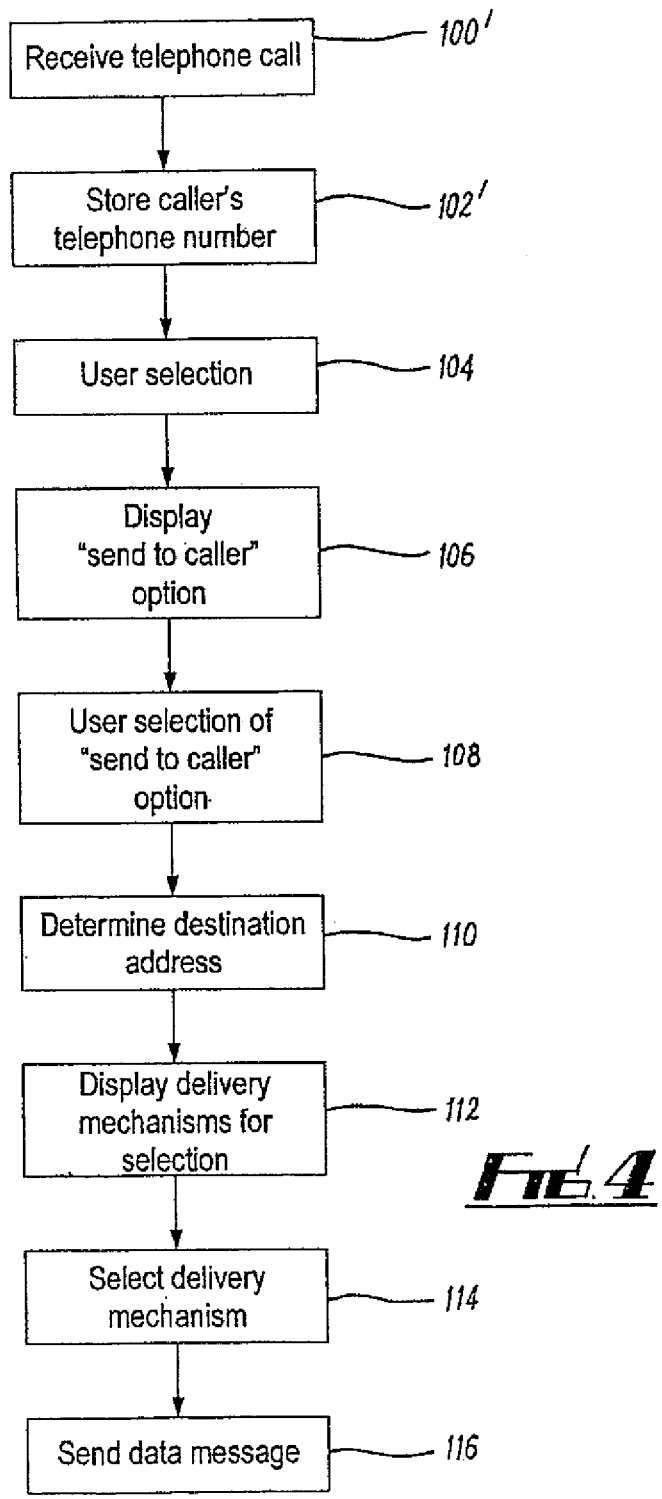

METHOD FOR SENDING A DATA MESSAGE DURING A TELEPHONE CALL

CROSS REFERENCE

This application is a continuation of U.S. patent application Ser. No. 10/725,274, filed on Nov. 25, 2003, the contents of which are incorporated herein by reference in its entirety.

FIELD OF THE INVENTION

Embodiments of the present invention relate to methods and devices for sending data.

BACKGROUND TO THE INVENTION

At present, if a user wishes, for example, to send a text message, the user must enter a text messaging application, write the message and then specify the address to which it should be sent before sending the messaging.

It would be desirable to improve the ease with which a user can send data using a mobile telephone.

BRIEF DESCRIPTION OF THE INVENTION

The inventors realised that the process by which data is sent by a mobile cellular telephone can be improved when the telephone is participating in a telephone call.

The inventors realised that when a party to an on-going telephone call wishes to send data during the telephone call, they will often wish to send that data to the other party or parties participating in the on-going telephone call.

According to one embodiment there is provided a method of sending data from a first party participating in a telephone call to a second party participating in the telephone call, comprising, in the terminal of the first party; storing, as a consequence of the telephone call, identifier data that identifies the second party; and using the stored identifier data to determine automatically a destination address for a data message; and sending, during the telephone call, the data message with the automatically determined destination address.

According to another embodiment there is provided a mobile cellular telephone terminal comprising: a radio cellular transceiver for enabling participation in a telephone call to a second terminal; a memory; and control means for storing in the memory, as a consequence of the telephone call, identifier data identifying the second terminal or its user, for determining automatically a destination address for a data message using the stored identifier data and for controlling the radio cellular transceiver to send the data message with the automatically determined destination address during the telephone call.

According to another embodiment there is provided a method for sending data from a first party participating in a telephone call to a second party participating in the telephone call, comprising, in the terminal of the first party: providing, while the telephone call is on-going, a user selectable option to transfer data to another party participating in the telephone call without user specification of a destination address.

According to another embodiment there is provided a mobile cellular telephone terminal comprising: a radio cellular transceiver for enabling participation in a telephone call to a second terminal; a user interface; and control means for providing, temporarily while the telephone call is on-going, in the user interface a user selectable option to transfer data to another party participating in the telephone call without user specification of a destination address.

Embodiments of the invention therefore provide an easier and faster way to send data to a likely recipient during a telephone call.

According to another embodiment there is provided a method of sending data from a first party to a second party, comprising, in the terminal of the first party: storing, as a consequence of a communication between the first party and the second party, identifier data that identifies the second party; using, subsequent to the communication between the first party and the second party, the stored identifier data to determine automatically a destination address for a data message; and sending the data message with the automatically determined destination address.

According to another embodiment there is provided a mobile communications terminal comprising: a radio cellular transceiver for enabling communication with a second terminal; a memory; and control means for storing in the memory, as a consequence of the communication, identifier data identifying the second terminal or its user, for determining automatically a destination address for a data message using the stored identifier data, and for controlling the radio cellular transceiver to send the data message with the automatically determined destination address.

BRIEF DESCRIPTION OF THE DRAWINGS

For a better understanding of the present invention reference will now be made by way of example only to the accompanying drawings in which:

FIG. 3 illustrates the process by which data is sent by the first terminal to the second terminal while it is participating in a telephone call with the second terminal; and FIG. 4 illustrates an alternative process by which data is sent by the first terminal to the second terminal while it is participating in a telephone call with the second terminal.

DETAILED DESCRIPTION OF EMBODIMENTS OF THE INVENTION

Figure 1:
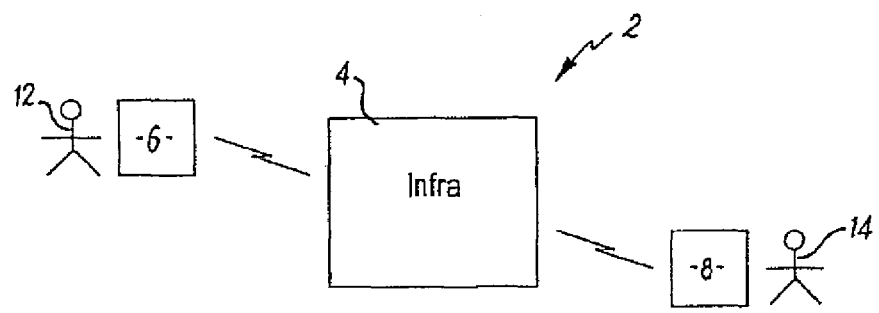
FIG. 1 illustrates a mobile cellular radio telecommunications network 2.

FIG. 1 illustrates a mobile cellular radio telecommunications network 2. The network 2 comprises network infrastructure 4 that typically includes a switching centre connected to a plurality of base transceiver stations, a first cellular mobile telephone terminal 6 and a second cellular mobile telephone terminal 8. In other embodiments, the network 2 may be connected to the public service telephone network (PSTN) and the second terminal 8 may be a telephone terminal or a computer terminal. The first mobile cellular telephone terminal 6 is used by a first user 12 and the second terminal 8 is used by a second user 14.

Figure 2:
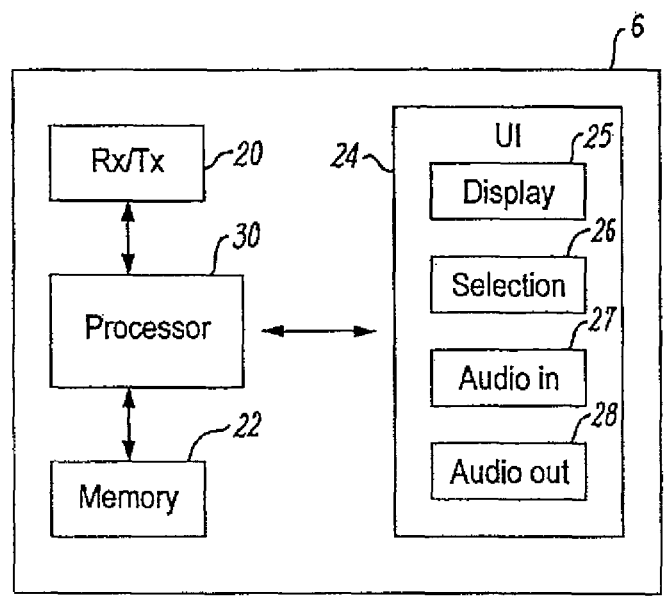
FIG. 2 illustrates the first mobile cellular telephone terminal 6 in more detail.

FIG. 2 illustrates the first mobile cellular telephone terminal 6 in more detail. It comprises: a radio cellular transceiver 20; a memory 22; a user interface 24 and a control means 30.

The user interface 24 includes a display 25, a user selection device 26 such a keypad or joystick, an audio input device 27 and an audio output device 28.

The control means 30 is provided, in this example, by a suitably programmed processor. The processor 30 is connected to provide information to and receive information from the radio cellular transceiver 20. This information includes speech and, may, in some embodiments, include data. The processor 30 is connected to read to and to write from the memory 22. The processor 30 is connected to provide display control signals to the display 25 and receive control signals from the selection device 26. During a telephone call, it also provides speech information received from the radio cellular transceiver 20 to the audio output device 28 and provides speech information received from the audio input device 27 to the radio cellular transceiver 20. In other embodiments one or more processors and one or more memories may be used.

The radio cellular transceiver 20 communicates wirelessly with the infrastructure 4 of the mobile cellular radio telecommunications network 2. This communication enables the terminal 6 to participate in a telephone call with the second terminal 8. The radio cellular transceiver 20 may additionally enable the first terminal 6 to communicate data to the second terminal 8. This may, for example, be as a multimedia messaging service (MMS) message, a short messaging service (SMS) message or as an email message. In other alternative embodiments, the first terminal may comprise an additional transceiver (not shown) for communicating with the second terminal. Such a transceiver is preferably a short-range wireless transceiver such as an infra-red (IR) transceiver of a low power radio frequency transceiver such as a Bluetooth (trademark) transceiver.

FIG. 3 illustrates the process by which data is sent by the first terminal 6 to the second terminal 8 while it is participating in a telephone call with the second terminal 8. The first user 12 and second user 14 are respective first and second parties to the telephone call. The process occurs within the first terminal 6 and is controlled by the processor 30.

In this example, the call is initiated by the first terminal 6 at step 100. As a consequence of the telephone call the processor 30, at step 102, automatically stores identifier data identifying the destination of the telephone call in the memory 22. In this case, the destination is the second terminal 8 or its user 14. If the telephone call is a circuit switched telephone call, the identifier data is the telephone number of the second party 14 and the memory 22 is a memory for storing dialed telephone numbers.

If during the telephone call the first party 12 wishes to send a data message to the other party 14, she makes a selection at step 104. The processor 30 responds to this selection at step 106 by controlling the display to provide a number of alternative user selectable options. The provided options depend upon the application from which the selection at step 104 is made. However, at least one option is "send to caller", the selection of which at step 108 enables a data message to be sent without the user input of a destination address.

The application is preferably context aware in the sense that it is aware that a telephone call is ongoing and the provided options are temporarily adapted to include "send to caller" as an additional option while the telephone call is on-going. This may be achieved by setting a flag in the memory 22 to indicate whether a call is on-going or not. The processor 30 responds to the selection at step 106 by reading the flag from the memory 22. If the flag indicates that a telephone call is not on-going the options provided at step 106 include the option "send" but not the "send to caller" option. Selection of the "send" option enables a data message to be sent after the user has input a destination address. If the flag indicates that a telephone call is on-going the options provided at step 106 include the option "send to caller" in addition to the option "send", thus augmenting the provided options.

One type of application is a data handling application such as a calendar application that stores appointments. The selection at step 104 enables a user to send details of an appointment as a data message. The selection at step 108 enables a user to send details of an appointment as a data message to the other party participating in an on-going telephone call without inputting the destination address. Another type of data handling message is a contacts application that stores contact details as a series of entries. Each entry may include a postal address, telephone numbers and email addresses. The selection at step 104 enables a user to send details from an entry as a data message. The selection at step 108 enables a user to send details from an entry as a data message to the other party participating in an on-going telephone call without inputting the destination address.

Another type of application is a data creation application such as a text entry application, a video camera application or a digital camera application. The selection at step 104 enables a user to send respectively text, a video clip or an image as a data message. The selection at step 108 enables a user to send respectively text, a video clip or an image as a data message to the other party participating in an on-going telephone call without inputting the destination address.

When the "send to caller" option is selected at step 108, the processor 30 at step 110 automatically determines a destination address for the data message using the identifier data stored at step 102. The processor 30 automatically interrogates a database using the telephone number stored at step 102 to obtain the destination address. The database associates different telephone numbers with the data delivery addresses of different persons. Each different identifier data is associated with the data delivery addresses of one person such as their email address, their telephone number, or their Bluetooth device address. The database may be the same database used by the Contacts application.

Then having determined the data delivery addresses, the processor 30 at step 112 controls the display to present for user selection one or more delivery mechanisms related to the determined delivery addresses.

If the determined delivery addresses includes a mobile telephone number, the delivery mechanisms may include: Short Messaging Service (SMS) which is suitable for alphanumeric text or Multimedia Messaging Service (MMS) which is suitable for still images.

The delivery mechanisms presented may be related to the application from which the selection has been made. Thus SMS is only presented if the selection is from an application that is text-based such as a Calendar, Contacts or text messaging. Thus MMS is only presented if the selection is from an application that is image-based such a digital camera application or an application that has the ability to insert images therein.

If the determined delivery addresses includes an email address the delivery mechanisms may include email, which is suitable for having text or mark-up language as its body and files as attachments, such as image or video files.

If the determined delivery addresses includes a Bluetooth Device address the delivery mechanism will include packet data.

At step 114 the user selects one of the presented delivery mechanisms.

At step 116, the processor controls the sending of the data message by the selected delivery mechanism using the destination address determined at step 110. The data message is sent via a new channel that runs in parallel with the voice channel used for the telephone call. If the data message is sent using the radio cellular transceiver it may be sent on a separate or the same transport layer to the voice call.

If there is only a single data delivery mechanism available steps 112 and 114 may be automated.

FIG. 4 also illustrates the process by which data is sent by the first terminal to the second terminal while it is participating in a telephone call with the second terminal. The steps 106 to 116 are the same, the steps 100' and 102' are different to the steps 100 and 102 in FIG. 3. In this example, the call is initiated by the first terminal at step 100'. As a consequence of the telephone call, at step 102', the processor 30 automatically stores identifier data identifying the origin of the telephone call in the memory. In this case, the destination is the second terminal or its user. If the telephone call is a circuit switched telephone call, the identifier data is the telephone number of the second party received via the radio cellular transceiver using call line identification (CLI) or its equivalent. However, when the "send to caller" option is selected at step 108, the processor 30 at step 110 automatically determines a destination address for a data message using the identifier data stored at step 102' not step 102.

In the preceding examples, data is sent by the first terminal to the second terminal while it is participating in a telephone call with the second terminal and the phone automatically presents the option "send to caller". In another example, data is sent by the first terminal to the second terminal after participation in a telephone call with the second terminal. This may occur while the first terminal is not participating in any telephone call or it may occur while the first terminal is participating in a telephone call with a third terminal. The phone may automatically present an option to "send to the last caller". The last caller may have originated or terminated the call with the first terminal.

Although embodiments of the present invention have been described in the preceding paragraphs with reference to various examples, it should be appreciated that modifications to the examples given can be made without departing from the scope of the invention as claimed.

The invention claimed is:

1. A method comprising:
   in a wireless terminal of a first party participating in a voice call, storing, as a consequence of the voice call, identifier data that identifies a second party participating in the voice call;
   using the stored identifier data to automatically determine a destination address for a data message;
   in response to receiving a selection by the first party to send the data message, controlling a display to display a plurality of delivery mechanisms for sending the data message from the wireless terminal of the first party to the second party, wherein the plurality of delivery mechanisms is determined in dependence of a type of the destination address; and
   controlling the wireless terminal of the first party to send the data message to the destination address using a selected delivery mechanism.

2. The method of claim 1, wherein using the stored identifier data to automatically determine a destination address for a data message comprises obtaining the destination address from a database.

3. The method of claim 2, wherein obtaining the destination address from a database comprises associating different identifier data in the database with data delivery addresses of different users.

4. The method of claim 1, wherein controlling the wireless terminal of the first party to send the data message to the destination address comprises sending the data message via a channel parallel to a voice channel used for the voice call.

5. The method of claim 1, wherein controlling the wireless terminal of the first party to send the data message to the destination address occurs during the voice call with the second party.

6. The method of claim 1, wherein controlling the wireless terminal of the first party to send the data message to the destination address occurs after termination of the voice call with the second party.

7. The method of claim 1, wherein the destination address is indicative of the second party and wherein controlling the wireless terminal of the first party to send the data message to the destination address occurs during the voice call to a third party.

8. An apparatus comprising:
   at least one processor; and
   at least one memory including computer program code, the at least one memory and the computer program code configured to, with the at least one processor, cause the apparatus to at least:
   in a wireless terminal of a first party participating in a voice call, store, as a consequence of the voice call, identifier data that identifies a second party participating in the voice call;
   use the stored identifier data to automatically determine a destination address for a data message;
   in response to receiving a selection by the first party to send the data message, control a display to display a plurality of delivery mechanisms for sending the data message from the wireless terminal of the first party to the second party, wherein the plurality of delivery mechanisms is determined in dependence of a type of the destination address; and
   control the wireless terminal of the first party to send the data message to the destination address using a selected delivery mechanism.

9. The apparatus of claim 8, wherein the destination address is obtained from a database.

10. The apparatus of claim 9, wherein the database from which the destination address is obtained comprises different identifier data associated with data delivery addresses of different users.

11. The apparatus of claim 8, wherein a data channel parallel to a voice channel is used for the voice call, the data channel being configured to send the data message to the destination address.

12. The apparatus of claim 8, wherein the apparatus is configured to control the wireless terminal of the first party to send the data message to the destination address during the voice call with the second party.

13. The apparatus of claim 8, wherein the apparatus is configured to control the wireless terminal of the first party to send the data message to the destination address after termination of the voice call with the second party.

14. The apparatus of claim 8, wherein the destination address is indicative of the second party and wherein the apparatus is configured to control the wireless terminal of the first party to send the data message to the destination address during the voice call to a third party.

15. A method, comprising:
   in a wireless terminal of a first party participating in a voice call, controlling a display to provide a user selectable option to transfer data to a second party participating in the voice call without user specification of a destination address;
   in response to receiving a selection of the provided option by the first party to transfer the data, controlling a display to display a plurality of delivery mechanisms for sending the data from the wireless terminal of the first party to the second party, wherein the plurality of delivery mechanisms is determined in dependence of a type of the destination address; and controlling the wireless terminal of the first party to send the data message to the determined destination address.

16. The method of claim 15, wherein controlling the wireless terminal of the first party to send the data message to the destination address occurs during the voice call with the second party.

17. The method of claim 15, wherein controlling the wireless terminal of the first party to send the data message to the destination address occurs after termination of the voice call with the second party.

18. An apparatus comprising:

at least one processor; and at least one memory including computer program code, the at least one memory and the computer program code configured to, with the at least one processor, cause the apparatus to at least:

in a wireless terminal of a first party participating in a voice call, control a display to provide a user selectable option to transfer data to a second party participating in the voice call without user specification of a destination address;

in response to receiving a selection of the provided option by the first party to transfer the data, control a display to display a plurality of delivery mechanisms for sending the data from the wireless terminal of the first party to the second party, wherein the plurality of delivery mechanisms is determined in dependence of a type of the destination address; and control the wireless terminal of the first party to send the data message to the determined destination address.

19. The apparatus of claim 18, wherein the apparatus is configured to control the wireless terminal of the first party to send the data message to the destination address during the voice call with the second party.

20. The apparatus of claim 18, wherein the apparatus is configured to control the wireless terminal of the first party to send the data message to the destination address after termination of the voice call with the second party.

* * * * *